July 12, 1949.                      E. D. WILLIAMS                      2,476,172
                                      COUPLING
                                 Filed Oct. 15, 1946

INVENTOR
EUGENE D. WILLIAMS
BY
Oldham & Oldham
ATTORNEYS

Patented July 12, 1949

2,476,172

UNITED STATES PATENT OFFICE 2,476,172

COUPLING

Eugene D. Williams, Cleveland Heights, Ohio, assignor to Diversified Designing & Machine Products Corporation, Cleveland, Ohio, a corporation of Ohio Application October 15, 1946, Serial No. 703,336

6 Claims. (Cl. 285—169)

This invention relates to couplings, especially to conduit coupling devices of the type used in connecting hose, or pipe sections, and the like together.

This invention relates to and is an improvement upon the invention disclosed and claimed in my co-pending application, Serial No. 652,605, filed March 7, 1946, now Patent No. 2,449,920, of which this application is a continuation-in-part.

Many types of couplings have been made heretofore and the coupling covered in my aforesaid application is of the quickly engageable and releasable type. Hose couplings, in many instances, such as air brake hose couplings and other safety installations, must form a union or connection which, when once engaged, will remain engaged until positively moved to a disengaged position. However, such positive lock couplings have frequently been very cumbersome and difficult to couple and uncouple, or have been expensive, have been open to other objections, or were not adapted to be made of the quickly engageable and releasable type.

The general object of this invention is to avoid and overcome the difficulties with and disadvantages of previous types of couplings of the type described and to provide a positive lock coupling characterized by its easy and rapid coupling and uncoupling movement.

A further object of the invention is to provide a coupling which is drawn away from its unlocking movement by the pressure in the members coupled together.

Another object of the invention is to provide a conduit coupling device which requires both an axially compressive and a rotary action to unlock it.

A further object of the invention is to provide an inexpensive, uncomplicated, positive-acting lock type coupling.

The foregoing and other objects and advantages of the invention, which will be made apparent as the specification proceeds, are achieved by the provision of two telescoping members which are axially movable when telescoped, a shoulder formed on one of the members and being provided with a recess therein, a ramp leading up to the top of the shoulder, and a spring detent resiliently mounted on the other of the members for radial movement and adapted to be sprung radially inwardly by the ramp and to snap into a locking position in the recess in the shoulder. The recessed member also has a cammed release surface which is on the opposite side of the shoulder as the ramp whereby the members can be moved axially to engage the detent with the recess and then must be moved together axially further relatively of one another to disengage the detent from the recess.

Attention now is directed to the accompanying drawings, wherein.

Figure 1:
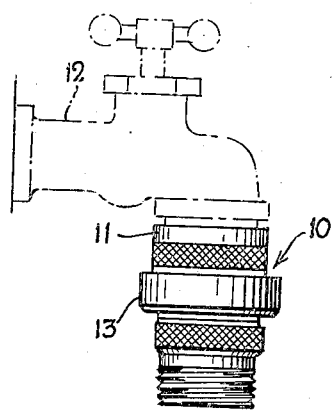
Fig. 1 is a side elevation of a coupling embodying the principles of my invention, showing it engaged with a faucet.

With specific reference to the details of the construction shown in the drawings, a coupling 10 is disclosed which includes a tubular male member 11, which has an enlarged end, adapted to engage with one of the members, such as a faucet 12 to be secured together and a tubular female member 13 adapted to engage with the second of the members to be coupled together. The male member 11 is provided with threads 14 or other conventional means at its outer end for engaging with one of the conduit means to be coupled by practice of the invention while the member 13 likewise has coupling means in the form of threads 15 formed on it at its outer end. The male coupling member 11 is snugly received in the female coupling member 13 and a suitable packing material or rubber ring 16 is carried by the member 13 in an annular recess 17 formed in the bore of that member to prevent fluid leakage at the coupling.

Figure 2:
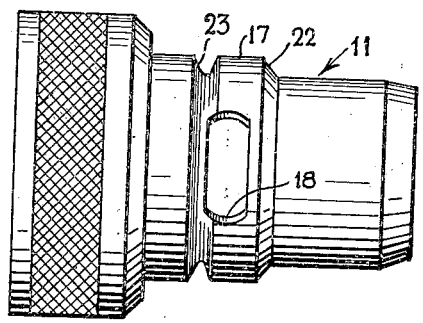
Fig. 2 is a side elevation of the male member of the coupling.

To secure the parts of the coupling 10 together, an annular shoulder 17 is formed on the outer surface of the male coupling member 11 intermediate the ends thereof, with such shoulder being of any desired axial length. Then one or more, in this instance two diametrically opposed recesses 18 are formed in the shoulder 17, which recesses are circumferentially directed and are of relatively short length, as shown in Fig. 2. Spring pressed detents 19 are provided in radially extending holes 20 formed in the member 13 and the detents are adapted to protrude, normally, into the bore of the female member 13 for locking engagement with the recesses 18. The detents 19 are preferably formed as spring pressed pins, although other forms of resilient detents could be designed, it only being necessary that they be limited to movement radially of the coupling bore. The detents 19 are positioned in a counterbore 20a formed in the female member 13 and they are urged inwardly of the member by springs 21 so as to permit free telescoping engagement of the members 11 and 13, initially, but to strike an annular ramp 22 that leads from the outer surface of the member 11 up to the top of the shoulder 17. Thus further telescoping movement of the coupling members forces the detents 19 back into the holes 20.

Figure 3:
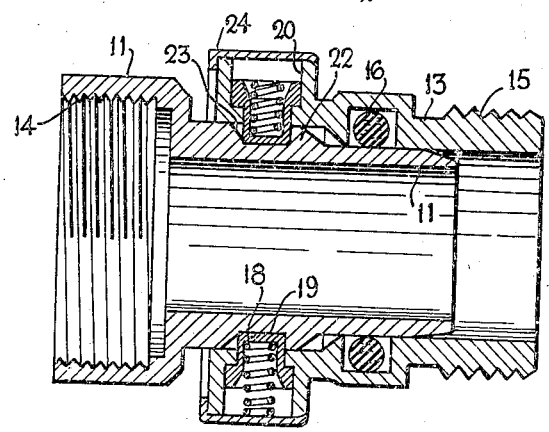
Fig. 3 is a longitudinal section through the coupling of Fig. 1 with it in its engaged position.

When the coupling members are engaged and in proper circumferential alignment, the detents 19 will engage with the recesses 18, as shown in Fig. 3 to lock the coupling members together and to prevent relative rotational movement therebetween. Thus the normal axial tensional or relative rotational forces exerted on the coupling 10 cannot unlock it so that once united, a positive unlocking action is necessary because the recesses 18 have sharp inner and side edge surfaces, and thus retain the detents therein until further telescoping movement occurs, as hereinafter explained.

To provide a positive acting unlocking action, cam surfaces 23 are formed on the outer surface of the male member 11 on the axially outer edges of the recesses 18 and these cams 23 connect the bottom of the recesses 18 to the top of the shoulder 17. Hence, continued relative axial movement of the coupling members after the detents 19 engage the recesses 18 will force the detents back into the member 13 and release them from the recesses 18. Then the members 11 and 13 must be rotated slightly with relation to each other, after which they can be uncoupled by an axially directed separating force and movement occasioned thereby. An annular lock ring 24 may be engaged with the end of the female member 13 to retain the spring detent means in position.

Figure 4:
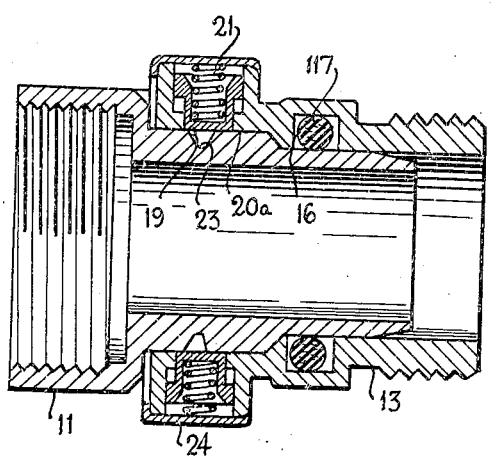
Fig. 4 is a section similar to Fig. 3 wherein the locking members are in their released positions.

Fig. 2 shows that the cam 23 may be annular for convenience of manufacture, while Fig. 4 shows how the detents 19 bridge the cam 23 to permit separation of the members 11 and 12 after the detents 19 are released and the members rotated slightly with relation to each other.

It will be realized that the recesses 18 can be on either of the coupling members and of any desired length but that the total circumferential length of the recesses must be less than 360° to provide bridge portions in the shoulder for passage of the detents on release movement. The invention contemplates use of coupling members wherein the shoulder 17 would extend the length of the member and merely be beveled off at the end of the member for engagement with the locking means carried by the other member in order to push them back into such member to permit telescoping engagement of the coupling sections. In all events, it is seen that a positive acting, improved coupling is provided by the invention and that the objects thereof are achieved.

While I have specifically illustrated and described one embodiment of my invention herein, it should be particularly understood that I am not to be limited thereto or thereby, but that the scope of my invention is defined in the appended claims.

I claim:

1. In a conduit coupling, a male member having a connector end and an inner end, and a female member adapted to receive the inner end of said male member with the members being adapted to be rotated and moved axially with relation to each other, an annular shoulder formed on said male member and having a recess of less than 360° extent formed therein, spring locking means carried by said female member and adapted to engage with the recess in said shoulder on relative axial movement of said members to retain same against relative rotational and separational movement, said male member having a release cam formed on its periphery with said shoulder being between such cam and the inner end of the member whereby continued axially inward movement of said members from their locked position releases said spring means from the recess in said shoulder and said members can be rotated relative to each other and then released by an axial separating movement.

2. A conduit coupling comprising two telescoping members which are axially movable when telescoped and locked in engagement, a shoulder formed on one of said members and being provided with a recess therein, a ramp leading up to the top of said shoulder, a spring detent resiliently mounted on the other member for radial movement and adapted to engage with and to be sprung radially inwardly by said ramp, said detent being adapted to snap into locking position behind said shoulder, and an annular release cam associated with said member having the shoulder thereon on the opposite side of the shoulder as the ramp, said release cam being adapted to free said detent from the recess on axial inward relative movement between said members.

3. A conduit coupling comprising two telescoping members which are axially movable when telescoped into engagement, one of said members being provided with a recess therein of less than 360° extent, and lock means resiliently mounted on the other of said members for radial movement and adapted to snap into locking position in the recess when said members are in proper circumferential relationship and are telescoped together, said recessed member having a cam release surface on its axially outer edge whereby said members can be moved axially to engage said lock means with said recess and then must be moved together axially further relatively of one another to disengage said lock means from said recess in order to permit disengagement of said members.

4. In a conduit coupling, a male member and a female adapted to be telescoped into engagement, relatively short circumferentially extending means associated with said members for locking them together against axial separation on relative telescoping movement when said members are properly positioned with relation to each other, and means for unlocking said members on further telescoping movement thereof, said last named means comprising a release cam formed on one of said members for engaging with said first named means to release same when in greater telescoped relation than required to engage said first means.

5. In a conduit coupling, a male member and a female member adapted to be telescoped into engagement, means associated with said members for locking them together on relative telescoping movement, and means for unlocking said members on further telescoping movement followed by relative rotational movement and an axial separation movement, said last named means comprising a release cam formed on one of said members for engaging with said first named means to release same when in greater telescoped relation than required to engage said first means; said last named means also including a rear shoulder, said first named means including a shoulder having a locking zone therein of less than 360° extent whereby proper arcuate positioning of said members permits disengagement after they are telescoped together so as to unlock the members.

6. A coupling as in claim 1 wherein said recess has sharp inner and side edges and with the outer edge of said recess being formed by said cam.

EUGENE D. WILLIAMS.

REFERENCES CITED

The following references are of record in the file of this patent:

UNITED STATES PATENTS

| Number | Name | Date |
|---|---|---|
| 1,809,237 | Halborg | June 9, 1931 |